United States Patent
Friedmann et al.

(10) Patent No.: US 10,708,977 B2
(45) Date of Patent: Jul. 7, 2020

(54) DUAL MODE WIRELESS ACCESS POINT

(71) Applicant: Hewlett Packard Enterprise Development LP, Houston, TX (US)

(72) Inventors: James Jay Friedmann, Santa Clara, CA (US); Farhan Hasnain, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 12 days.

(21) Appl. No.: 15/704,108

(22) Filed: Sep. 14, 2017

(65) Prior Publication Data
US 2019/0082497 A1 Mar. 14, 2019

(51) Int. Cl.
  H04W 24/02 (2009.01)
  H04L 5/00 (2006.01)
  H04W 36/00 (2009.01)
  H04W 36/08 (2009.01)
  H04W 36/06 (2009.01)
  (Continued)

(52) U.S. Cl.
CPC .......... *H04W 88/10* (2013.01); *H04L 5/0096* (2013.01); *H04W 16/04* (2013.01); *H04W 24/02* (2013.01); *H04W 84/12* (2013.01); H04B 1/006 (2013.01); H04L 5/0007 (2013.01); H04L 5/0092 (2013.01); H04L 27/2601 (2013.01); H04W 4/021 (2013.01); H04W 36/0066 (2013.01); H04W 36/06 (2013.01); H04W 36/08 (2013.01);
(Continued)

(58) Field of Classification Search
None
See application file for complete search history.

(56) References Cited

U.S. PATENT DOCUMENTS 9,565,566 B1 2/2017 Boppana et al.
9,565,627 B2 2/2017 Subramanian et al.
(Continued)

FOREIGN PATENT DOCUMENTS

EP 3030039 A1 6/2016

OTHER PUBLICATIONS

Extended European Search Report and Written Opinion received for European Patent Application No. 17199004.7, dated Jun. 13, 2018, 12 pages.

(Continued)

*Primary Examiner* — Kodzovi Acolatse
*Assistant Examiner* — The Hy Nguyen
(74) *Attorney, Agent, or Firm* — Hewlett Packard Enterprise Department

(57) ABSTRACT

An example method comprising: activating a first radio of a wireless access point to communicate with a first set of client devices by transceiving signals on channels within a first frequency band; activating a second radio of the wireless access point to communicate with a second set of client devices by transceiving signals on channels within a second frequency band; receiving a command from a network controller to change frequency bands of the wireless access point; toggling the first radio from a first antenna circuit to a second antenna circuit to connect the first radio to an antenna such that the first radio is capable of transceiving signals on channels within a first sub-band of the first frequency band; and configuring the second radio to transceive signals on channels within a second sub-band of the first frequency band.

19 Claims, 10 Drawing Sheets

(51) Int. Cl.
*H04W 88/10* (2009.01)
*H04W 84/12* (2009.01)
*H04W 16/04* (2009.01)
H04B 1/00 (2006.01)
*H04W 88/08* (2009.01)
H04L 27/26 (2006.01)
*H04W 4/021* (2018.01)
*H04W 72/04* (2009.01)

(52) U.S. Cl.
CPC ...... *H04W 72/0453* (2013.01); *H04W 88/085* (2013.01)

(56) References Cited

U.S. PATENT DOCUMENTS

| | | | |
|---|---|---|---|
| 2003/0112180 A1* | 6/2003 | Wight | H01Q 3/00 342/374 |
| 2012/0009887 A1 | 1/2012 | Sanguinetti et al. | |
| 2014/0031042 A1* | 1/2014 | Smiley | H04W 72/0453 455/438 |
| 2015/0271829 A1 | 9/2015 | Amini et al. | |
| 2015/0282032 A1* | 10/2015 | Gupta | H04W 72/0453 370/237 |
| 2015/0312835 A1 | 10/2015 | Subramanian et al. | |
| 2017/0055159 A1* | 2/2017 | Boppana | H04W 16/12 |
| 2017/0280349 A1* | 9/2017 | Ansley | H04W 28/0284 |
| 2017/0359851 A1* | 12/2017 | Kakinada | H04W 36/08 |
| 2018/0176904 A1* | 6/2018 | Yerramalli | H04W 72/0413 |
| 2018/0234902 A1* | 8/2018 | Talbert | H04W 36/14 |

OTHER PUBLICATIONS

Huawei AP4030TN Access Point Datasheet; Apr. 26, 2016; 12 pages.

Kiviniemi, J.; "Dual-5GHz Support for Cisco 2802/3802 and More: Ekahau Site Survey 8.5.1 Released"; Mar. 21, 2016; 5 pages.

Mcintyre, K.; "Suffering from Wi-Fi Congestion? Dual 5GHz Radios can Help"; Jul. 20, 2016; 8 pages.

* cited by examiner

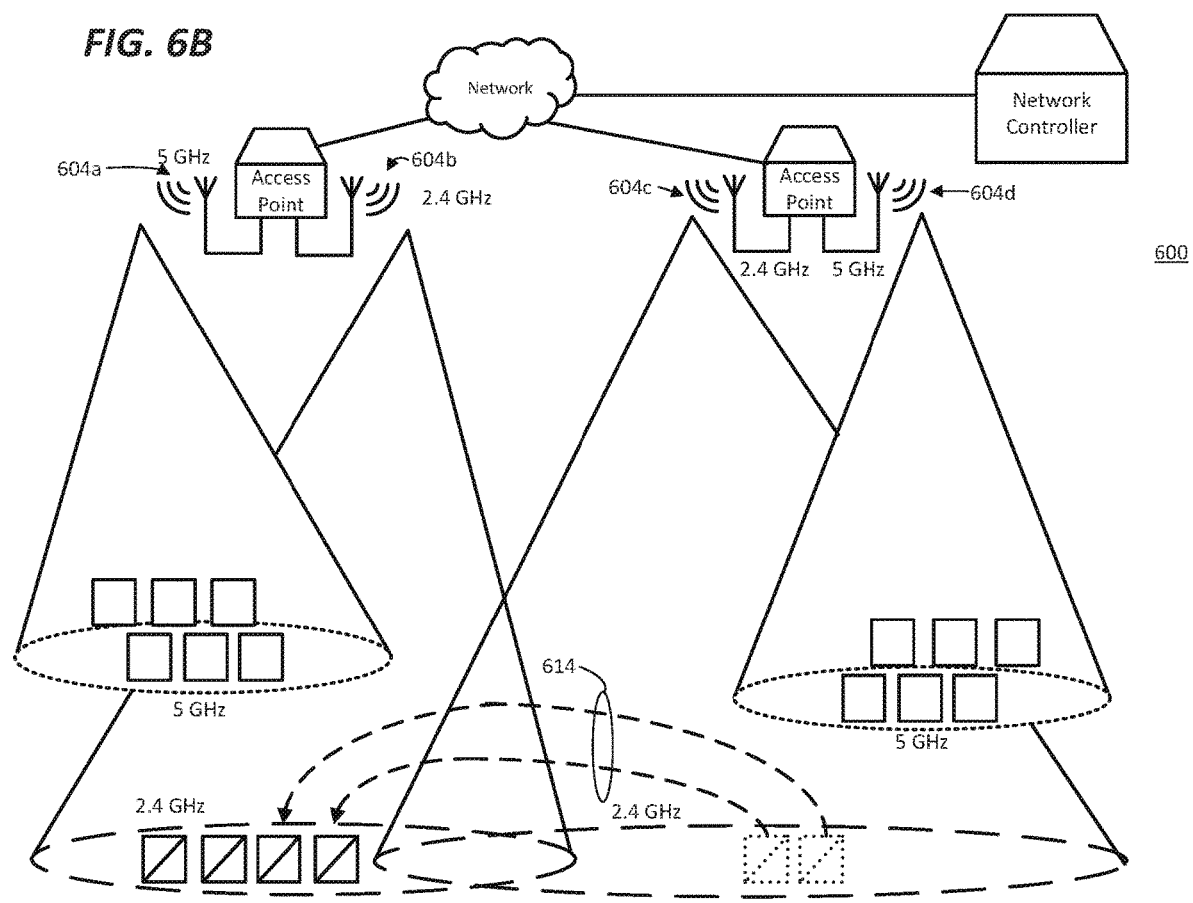

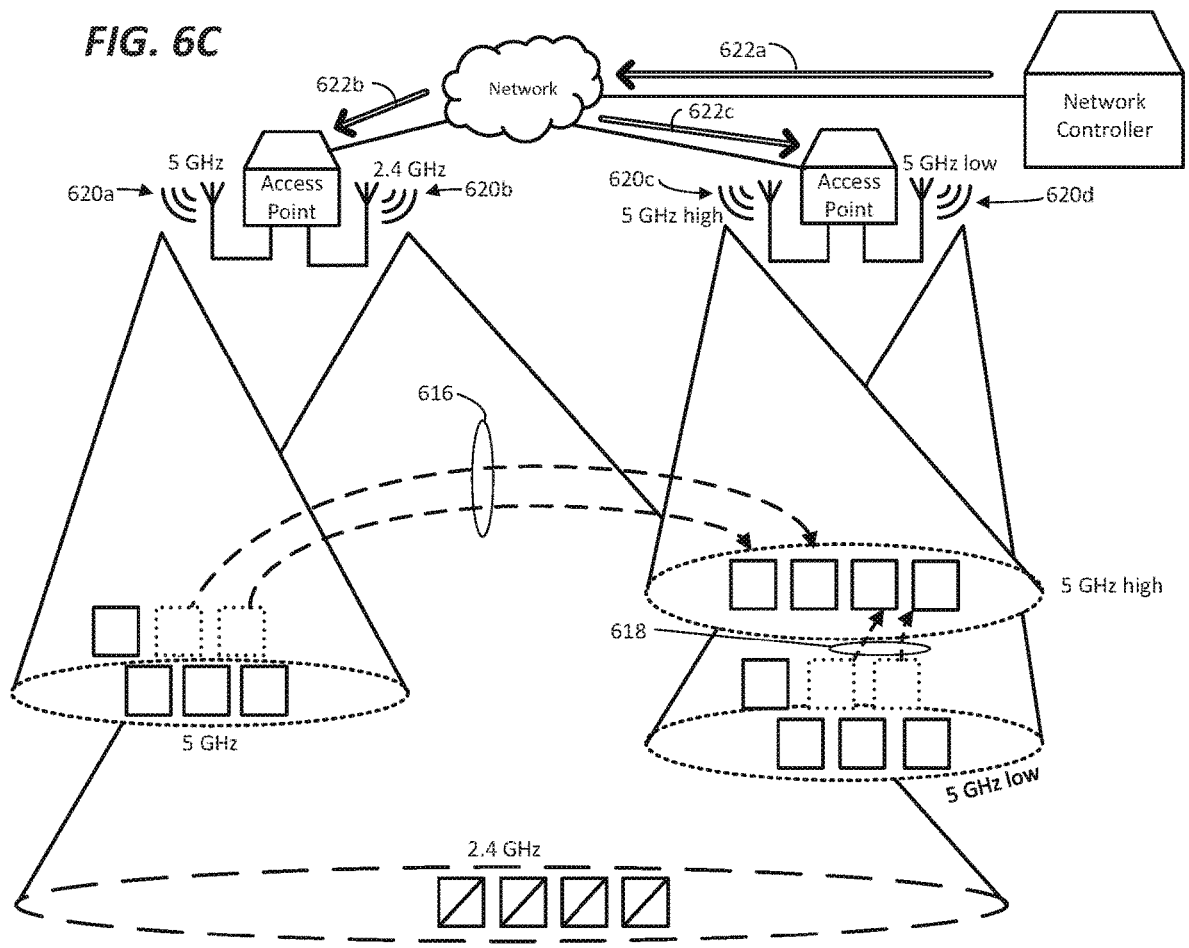

DUAL MODE WIRELESS ACCESS POINT

BACKGROUND

As Internet-connected client devices have proliferated and increased their individual and collective bandwidth consumption, wireless access points have evolved to handle this ever-increasing data load. Certain wireless access points can communicate with client devices on channels within two different frequency bands. Commonly, this arrangement is called "dual-band" and includes channels in the 2.4 GHz frequency band (also called "2G") and the 5 GHz frequency band (also called "5G"). Each of these frequency bands has tradeoffs that make it more or less suitable for a particular situation. For example, channels in the 2.4 GHz frequency band have a lower data transfer rate than channels in the 5 GHz frequency band, but a 2.4 GHz connection can be maintained over a longer distance than a 5 GHz connection.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 6B illustrates the example wireless network of FIG. 6A, where client devices have migrated from one access point to another;

FIG. 6C illustrates the example wireless network of FIGS. 6A-6B, where the wireless network adjusts based on the client device migration;

Figure 1:
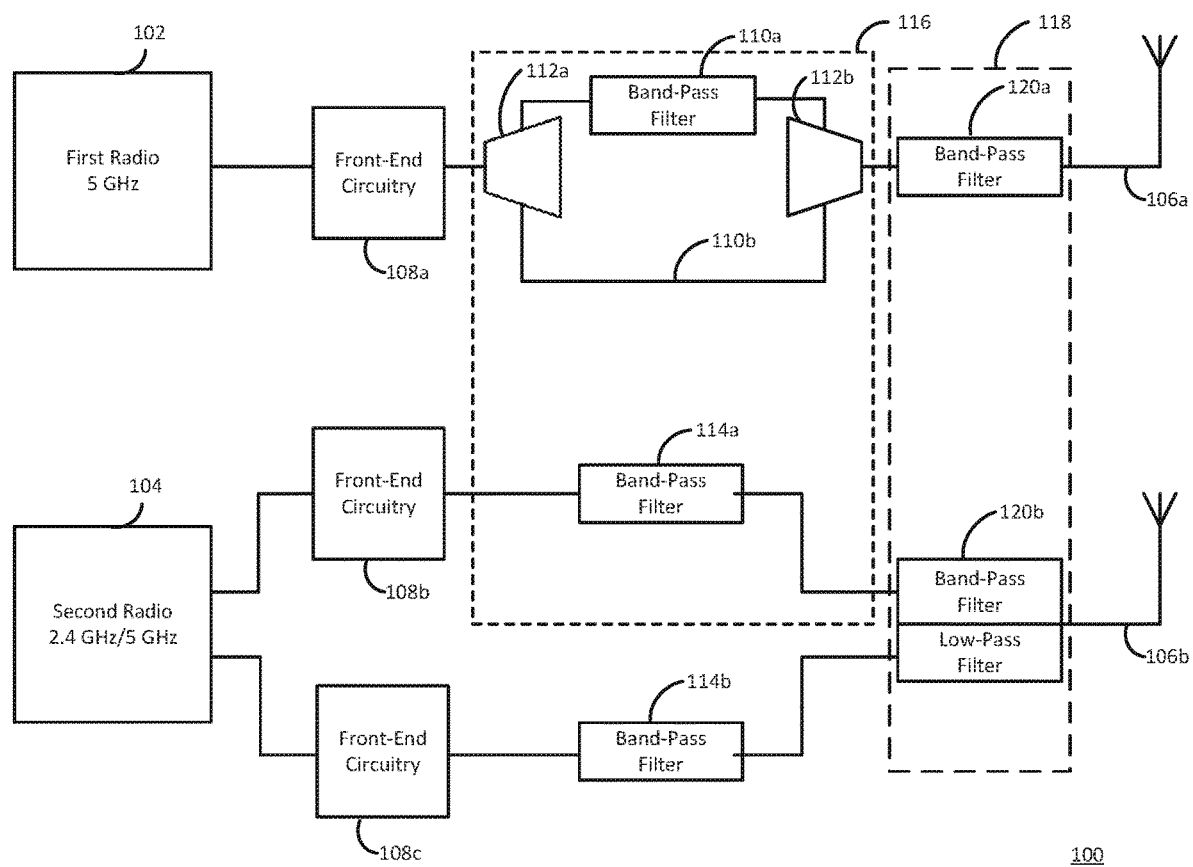
FIG. 1 illustrates an example radio system of a wireless access point.

Certain examples have features that are in addition to or in lieu of the features illustrated in the above-referenced figures. Certain reference numerals have been omitted for the sake of clarity.

DETAILED DESCRIPTION

As wireless Internet connectivity becomes more complex and intelligent, and as the data demand of client devices increase, a wireless network needs the ability to adapt to its circumstances. Dual-band access points are used to take advantage of the data transfer rate benefits of the 5 GHz frequency band and the range and backwards-compatibility benefits of the 2.4 GHz frequency band. In certain wireless networks (e.g. enterprise networks), multiple access points are controlled by a network controller to provide consistent connectivity to client devices. In this disclosure, an "access point" is a wireless access technology that transceives network traffic with client devices. An "access point" is not limited to IEEE 802.11-based technology. One benefit of controlling multiple access points with a network controller is an orderly handoff of a client device from one access point to another. When certain wireless networks are designed and installed, the access points are arranged to provide uninterrupted connectivity within a geographical coverage area. In some example networks, access points have overlapping geographic coverage. For example, in some dual-band networks, 5 GHz connectivity areas of adjacent access points may minimally overlap and 2.4 GHz connectivity areas of the same adjacent access points may overlap more substantially. In another example, 5 GHz connectivity areas of adjacent access points do not overlap, and client devices located in the gap between the 5 GHz connectivity areas are to be connected through the 2.4 GHz frequency band. In this disclosure, the term "wireless network" is interchangeable with "wireless local area network." As used herein, the term "wireless local area network" (MAN) can, for example, refer to a communications network that links two or more devices using a wireless distribution method (for example, spread-spectrum or orthogonal frequency-division multiplexing radio), and provides a connection through an access point to the Internet. A MAN thus allows users to move around within a local coverage area and remain connected to the network.

In certain examples, an access point that is capable of transceiving signals in a dual-band mode can also be configured to transceive signals in a dual-5G mode. In some example access points, two wireless radios are configured to transceive 5 GHz signals and 2.4 GHz signals, respectively, while in dual-band mode. While in dual-5G mode, one of the wireless radios is configured to transcieve signals in a high sub-band of the 5 GHz frequency band and the other wireless radio is configured to transceive signals in a low sub-band of the 5 GHz frequency band. In some other examples, a 2.4 GHz radio is disabled and a second 5 GHz radio is enabled. In some example networks, client devices regularly move within the geographical coverage area of the network. In some circumstances, client devices may congregate in an area close to one access point. In such circumstances, and example network controller may adjust the network to handle the concentrated group of client devices with a lower likelihood of degradation of service.

In certain example networks, the network controller detects that the network topology needs adjustment and sends a command to an access point to change frequency bands from dual-band to dual-5G (or vice versa). Upon receiving such a command, an example access point configures its wireless radios in compliance with the command. For example, an access point with two radios in dual-band configuration may alter the antenna circuitry to one radio to pass signals through an additional band-pass filter, tuning the antenna circuitry to a sub-band of the 5 GHz frequency band. In this disclosure, a "network controller" is a network device that offers centralized network engineering, IP services, security and policy controls, and app-aware platforms. A network controller may be deployed as different components of the WLAN (e.g. a branch gateway, VPN concentrator, WIPS/WIDS and spectrum monitor, stateful network firewalls with integrated content filtering, etc.) Additionally, an example access point may configure a second radio to use antenna circuitry tuned to another sub-band of the 5 GHz frequency band, resulting in dual-5G operation of the access point. Similarly, in another example, an access point with two radios in dual-5G configuration may alter the antenna circuitry to one radio to pass signals around an additional band-pass filter, tuning the antenna circuitry to the 5 GHz frequency band. Additionally, an example access point may configure a second radio to use antenna circuitry tuned to the 2.4 GHz, resulting in dual-band operation of the access point. In some examples, certain client devices are capable of communicating in the 2.4 GHz frequency band but not the 5 GHz frequency band. Such client devices are disconnected from the access point when the access point switches to dual-5G operation. In some examples, such client devices are within the 2.4 GHz range of an adjacent access point and are transferred to be associated with the adjacent access point that operates on the 2.4 GHz frequency band.

The following example describes the operation of an example enterprise network that alters network topology in response to changes in circumstances. In the example enterprise network, client devices may spread across the geographic area of the network. Multiple access points may operate in dual-band mode, transceiving signals with client devices on channels within the 5 GHz frequency band or within the 2.4 GHz frequency band. Client devices may then congregate in a geographical coverage area. For example, there may be a meeting in a conference room. During such a time, the geographically nearest access point may not be able to handle the increased data traffic load while operating in dual-band mode. The network controller, after detecting the critical mass of client devices in one access point's geographical coverage area (wherein client devices can couple to the access point), may reconfigure the network topology to handle the increased data traffic load. For example, the network controller may send a command to the geographically nearest access point to switch to dual-5G mode and may also send a command to an adjacent access point to switch to dual-band mode so that client devices that are incapable of transceiving 5 GHz signals can connect to the adjacent access point. In some example enterprise networks, each access point has a geographical coverage area that overlaps the geographical coverage areas of adjacent access points. Some such example enterprise networks have sufficient overlap of the 2.4 GHz geographical coverage area that all portions of a dual-5G access point's geographical coverage area is covered by adjacent dual-band access points' 2.4 GHz geographical coverage areas.

FIG. 1 illustrates example radio circuitry of an example access point. Radio circuitry 100 may include multiple components electrically coupled via traces on a printed circuit board. In some examples, radio circuitry 100 may be contained within a system on a chip (SOC). In some other examples, radio circuitry 100 is a combination of a SOC and other discrete components. For example, certain radio circuitry 100 may include an integrated circuit for each radio 102 and 104, an integrated circuit for each front-end circuitry 108, and discrete components for sub-band filter 116 and band filter 118. As another example, the radio circuitry of first radio 102 (including front-end circuitry 108a, RF switches 112, sub-band filters 110, band filter 120a, and antenna 106a) is contained within a SOC, and the radio circuitry of second radio 104 is contained within another SOC. Although certain specific examples of the physical layout of radio circuitry 100 have been discussed, this disclosure contemplates any physical arrangement of components, integrated circuits, and SOCs as appropriate.

In example radio circuitry 100, first radio 102 is capable of transceiving signals on channels within the 5 GHz frequency band. In certain examples, first radio 102 is capable of transceiving signals within any appropriate frequency band, but the hand filter 118 and the sub-band filter 116 restrict first radio 102 to transceiving signals within the 5 GHz frequency band. In certain configurations, first radio 102 may be able to transceive signals within a sub-band of the 5 GHz frequency band. Although first radio 102 is described in relation to transceiving signals on the 5 GHz frequency hand, it is contemplated that first radio 102 could transceive signals on any appropriate frequency band, including the 2.4 GHz frequency band.

First radio 102 is coupled to front-end circuitry 108a. In some examples, front-end circuitry 108a includes one or more power amplifiers, one or more low noise amplifiers, one or more power detectors, and RF switches to bypass portions of front-end circuitry 108a. In certain examples, front-end circuitry 108a may also be called a front-end module. In this disclosure, the term "RF switch" may refer to a device capable of routing a radio frequency (RF) signal along one of two paths based on an input. This is in contrast to a "network switch," which is a networking component for routing packets to a destination device. In certain examples, front-end circuitry 108a includes power amplifiers. In certain other examples, front-end circuitry 108a includes low noise amplifiers. Coupled to front-end circuitry 108a is sub-band filter 116. For the antenna circuitry coupled to first radio 102, sub-band filter 116 may include a band-pass filter 110a and a bypass 110b controlled by single-pole double-throw (SPDT) RF switches 112. In some examples, RF switches 112 toggle the antenna circuit between 5 GHz mode, and a 5 GHz sub-band mode. Sub-band filter 116 is coupled to band filter 118, which includes band-pass filter 120a. Band-pass filter 120a filters signals so that signals within the 5 GHz frequency band pass through band filter 118. Band filter 118 is coupled to antenna 106a.

In one example configuration, a signal is received at antenna 106. The signal may include noise, which may include signals from undesired sources, harmonic signals from desired sources, and distortions of the signal as transmitted. By passing the signal through band filter 118, band-pass filter 120a filters out all portions of the signal that are not within the desired frequency band. From band filter 118 the signal proceeds to sub-band filter 116. RF switch 112b routes the signal to band-pass filter 110a, which, similarly to band-pass filter 120a, filters out all undesired portions of the signal. Band-pass filter 110a filters all portions of the signal that are not within a desired sub-band of the desired frequency band. The signal then proceeds through RF switch 112a and out of sub-band filter 116 to front-end circuitry 108a. Front-end circuitry 108a receives the signal and amplifies it. In some examples, front-end circuitry 108a further reduces noise in the signal while amplifying the desired portions of the signal. From front-end circuitry 108a, the signal passes to first radio 102, which processes the signal for use in network communications.

In another example configuration, a signal is received at antenna 106a. The signal may include noise, which may include signals from undesired sources, harmonic signals from desired sources, and distortions of the signal as transmitted. By passing the signal through hand filter 118, band-pass filter 120a filters out all portions of the signal that are not within the desired frequency band. From band filter 118 the signal proceeds to sub-band filter 116. RF switch 112b routes the signal to bypass 110b, avoiding band-pass filter 110a. Since no sub-band filtering occurs, the signal is still filtered to the desired frequency band. The signal then proceeds through RF switch 112a and out of sub-band filter 116 to front-end circuitry 108a. Front-end circuitry 108a receives the signal and amplifies it. In some examples, front-end circuitry 108*a* further reduces noise in the signal while amplifying the desired portions of the signal. From front-end circuitry 108*a*, the signal passes to first radio 102, which processes the signal for use in network communications.

In example radio circuitry 100, second radio 104 is capable of transceiving signals on channels within the 5 GHz frequency band and on channels within the 2.4 GHz frequency band. In certain examples, second radio 104 is capable of transceiving signals within any appropriate frequency band, but the band filter 118 and the sub-band filter 116 restrict second radio 104 to transceiving signals within the 5 GHz and 2.4 GHz frequency bands. In certain configurations, second radio 104 may be able to transceive signals within a sub-band of the 5 GHz frequency band. Although second radio 104 is described in relation to transceiving signals on the 5 GHz and 2.4 GHz frequency bands, it is contemplated that second radio 104 could transceive signals on any appropriate frequency band.

Second radio 104 is coupled to front-end circuitry 108*b* and 108*c*. In some examples, front-end circuitry 108*b* and 108*c* each include at least one power amplifier, at least one low noise amplifier, at least one power detector, and multiple RF switches to bypass portions of front-end circuitry 108*b* and 108*c*. In certain examples, front-end circuitry 108*b* and 108*c* may also be called a front-end module. In certain examples, front-end circuitry 108*b* and 108*c* include power amplifiers. In certain other examples, front-end circuitry 108*b* and 108*c* include low noise amplifiers. Coupled to front-end circuitry 108*b* and 108*c*, respectively, is sub-band filter 116. For the antenna circuitry coupled to second radio 104, sub-band filter 116 may include a band-pass filter 114*a*. Front-end circuitry 108*b* is coupled to band-pass filter 114*a* and front-end circuitry 108*c* is coupled to band-pass filter 114*b*. In some examples, second radio 104 is configured in one of: a 5 GHz sub-band mode, and a 2.4 GHz mode. Sub-band filter 116 is coupled to band filter 118, which includes filter 120*b*. Filter 120*b* filters signals so that signals within the desired frequency band pass through band filter 118. Band filter 118 is coupled to antenna 106*b*.

In some examples, there are two antenna sub-circuits coupled to second radio 104. The first antenna sub-circuit, including front-end circuitry 108*b*, band-pass filter 114*a*, and the band-pass portion of filter 120*b*, provides a 5 GHz sub-band signal to second radio 104. The second antenna sub-circuit, including front-end circuitry 108*c*, band-pass filter 114*b*, and the low-pass portions of filter 120*b*, provides a 2.4 GHz signal to second radio 104. In certain examples, a signal received on antenna 106*b* may be filtered on both the first antenna sub-circuit and the second antenna sub-circuit, providing second radio 104 with a 5 GHz sub-band signal and a 2.4 GHz signal simultaneously. In such an example, second radio 104 may be configured to receive one of the two signals. In other examples, filter 120*b* is enabled to either operate its band-pass portion and provide a signal through the first antenna sub-circuit or operate its low-pass portion and provide a signal through the second antenna sub-circuit. In certain examples, each antenna sub-circuit coupled to second radio 104 contains its own antenna. In contrast to FIG. 1, each sub-circuit in such examples would contain its own filter 120*b* and its own antenna 106*b*.

In one example configuration, a signal is received at antenna 106*b*. The signal may include noise, which may include signals from undesired sources, harmonic signals from desired sources, and distortions of the signal as transmitted. By passing the signal through band filter 118, filter 120*b* uses its band-pass portion to filter out all portions of the signal that are not within the desired frequency band. From band filter 118 the signal proceeds to sub-band filter 116. Band-pass filter 114*a* filters all portions of the signal that are not within a desired sub-band of the desired frequency band. The signal then proceeds to front-end circuitry 108*b*. Front-end circuitry 108*b* receives the signal and amplifies it. In some examples, front-end circuitry 108*b* further reduces noise in the signal while amplifying the desired portions of the signal. From front-end circuitry 108*b*, the signal passes to second radio 104, which processes the signal for use in network communications.

In another example configuration, a signal is received at antenna 106*b*. The signal may include noise, which may include signals from undesired sources, harmonic signals from desired sources, and distortions of the signal as transmitted. By passing the signal through band filter 118, filter 120*b* uses its low-pass portion to filter out all portions of the signal that higher frequency than the desired frequency hand. From band filter 118 the signal proceeds to band-pass filter 114*b*. Band-pass filter 114*b* filters out all remaining portions of the signal that are outside the desired frequency band. Since no sub-band filtering occurs, the signal is still filtered to the desired frequency band. The signal then proceeds from band-pass filter 114*b* to front-end circuitry 108*c*. Front-end circuitry 108*c* receives the signal and amplifies it. In some examples, front-end circuitry 108*c* further reduces noise in the signal while amplifying the desired portions of the signal. From front-end circuitry 108*c*, the signal passes to second radio 104, which processes the signal for use in network communications.

In an example mode of operation, an example access point containing radio circuitry 100 operates in a dual band mode, wherein RF switches 112 pass the signal through bypass 110*b*, activating first radio 102 to transceive signals to communicate with client devices in the 5 GHz frequency band. First radio 102 establishes communication with client devices on channels established within the 5 GHz frequency band. Channels may refer to frequency ranges reserved for devices (e.g. access points and client devices) to use for communicating with each other. Channels are defined to reduce unwanted interference between devices communicating in the same frequency band. The access point further configures second radio 104 to transceive signals received on the second antenna sub-circuit (i.e. front-end circuitry 108*c* and band-pass filter 114*b*) to communicate with client devices in the 2.4 GHz frequency band. Second radio 104 is activated to establish communication with client devices on channels established within the 2.4 GHz frequency band.

Further describing the aforementioned example mode of operation, a network controller may send a command for the access point to switch from dual band mode to dual-5G mode. Dual-5G mode configures both radios to transceive signals in the 5 GHz frequency band. One radio transceives signals on a lower sub-band of the 5 GHz frequency band, and the other radio transceives signals on a higher sub-band of the 5 GHz frequency band. In some examples, the lower sub-band and the higher sub-band combine to cover the entirety of the 5 GHz frequency band. Upon receiving the command from the network controller, the example access point toggles RF switches 112*a* and 112*b* to pass signals through band-pass filter 110*a*. This toggle results in a transition period during which first radio 102 cannot transceive any signals. In some examples, the transition period is of a duration less than 20 nanoseconds. Once the transition period has passed, first radio 102 is capable of transceiving signals in a first sub-band of the 5 GHz frequency band. In certain examples, the first sub-band is the higher sub-band of the 5 GHz frequency band. Also, the example access point configures second radio 104 to transceive signals in a second sub-band of the 5 GHz frequency band. In certain examples, the second sub-band is the lower sub-band of the 5 GHz frequency band. In some examples, this configuration also results in a transition period of a duration less than 20 nanoseconds. In some other examples, this configuration is performed substantially instantaneously. In certain examples, filter 120b outputs signals from both its band-pass portion and its low-pass portion simultaneously, and the configuration of second radio 104 is an internal software configuration within second radio 104. In certain other examples, filter 120b is, upon the configuration of second radio 104, toggled from outputting signals from its low-pass portion to outputting signals from its band-pass portion.

The resulting configuration in the example mode of operation is that first radio 102 is toggled from 5 GHz operation to 5 GHz high-band operation, and second radio 104 is configured from 2.4 GHz operation to 5 GHz low-band operation.

Figure 2:
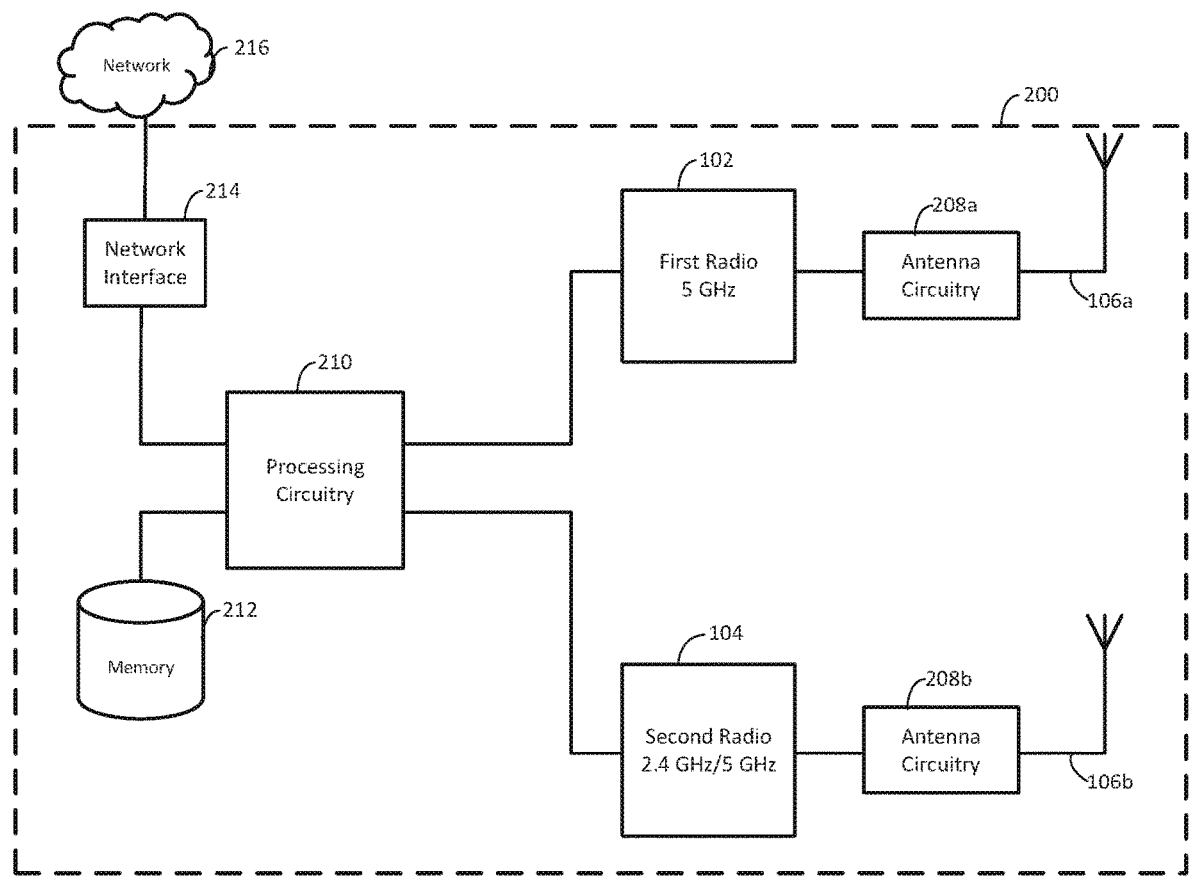
FIG. 2 illustrates a block diagram of an example access point.

FIG. 2 illustrates an example access point coupled to a network. Access point 200 includes a first radio 102 coupled to a first antenna 106a through antenna circuitry 208a. In some examples, antenna circuitry 208a includes front-end circuitry, sub-band filters, and band filters. Similarly, access point 200 also includes a second radio 104 coupled to a second antenna 106b through antenna circuitry 208b. Likewise, in some examples, antenna circuitry 208b includes front-end circuitry, sub-band filters, and band filters. First radio 102 and second radio 104 are coupled to processing circuitry 210, which is subsequently coupled to memory 212 and network interface 214. Network interface 214 is coupled to a network 216. In some examples, network interface 214 is coupled to network 216 by Ethernet.

In certain examples, processing circuitry 210 executes instructions stored in memory 212 in order to operate first radio 102, second radio 104 and network interface 214. Processing circuitry 210 may include one or more central processing units (CPUs), and other processing circuitry (e.g. microcontrollers, application specific integrated circuits (ASICs), etc.). In some examples, first radio 102, second radio 104, and processing circuitry 210 are contained on one single integrated circuit, a SOC. In some other examples, each of first radio 102, second radio 104, and processing circuitry 210 are contained on individual integrated circuits. This disclosure contemplates any physical arrangement of the components shown in FIG. 2, whether they be combined into a single integrated circuit or arranged as individual components (or any combination thereof).

Processing circuitry 210 may receive signals received at first radio 102 and second radio 104, and may instruct first radio 102 and second radio 104 to transmit signals as appropriate. Similarly, processing circuitry 210 may receive signals received at network interface 214 and may instruct network interface 214 to transmit signals as appropriate. In some examples, signals received at any one of first radio 102, second radio 104, and network interface 214 may be destined for a client device on any one of first radio 102, second radio 104, and network interface 214 (or more than one in the case of multicast and broadcast signals). Processing circuitry 210 may route the signals to the appropriate component. Signals sent and received from access point 200 may include network packets (e.g. TCP/IP, UDP, etc.). In some examples, network interface 214, first radio 102, and second radio 104 extract the digital data including the network packets from a received signal, and processing circuitry 210 deals with the digital data rather than the received signals themselves.

FIG. 3 illustrate an example wireless network. Wireless network 300 includes an access point 302, client devices 310 and 312, a network 314, and a network controller 316. In some examples, wireless network 300 is a portion of a larger wireless network including multiple access points and network controllers. For example, FIG. 3 may illustrate a small geographical portion of an enterprise campus-wide wireless network. Due to the complex nature of FIG. 3, certain labels are omitted from certain figures for clarity sake. Any reference to a label in reference to one of FIG. 3 is to be understood to apply to that figure and subsequent FIG. 3.

Figure 3A:
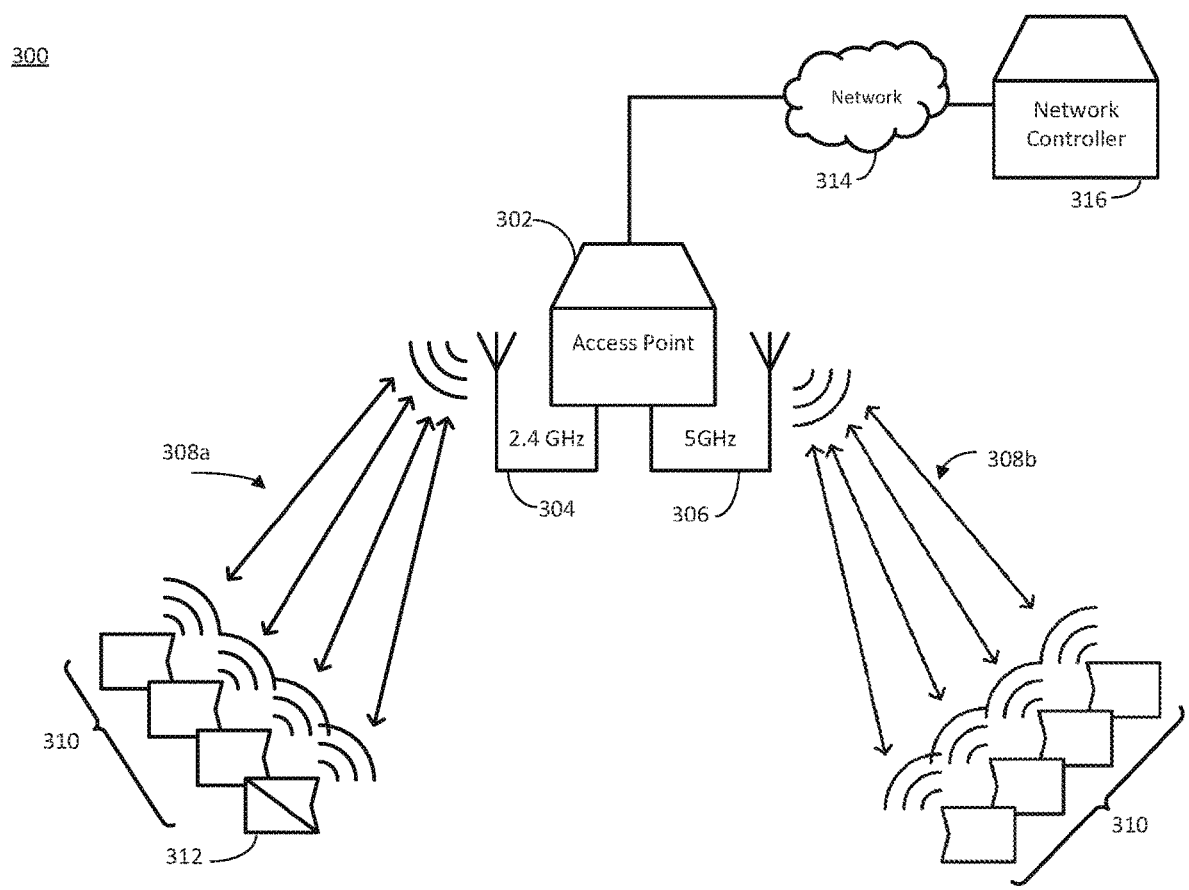
FIG. 3A illustrates an example wireless network including an access point in dual-band mode.

In FIG. 3A, wireless network 300 is operating with access point 302 in a dual-band configuration, antenna 304 of access point 302 is transceiving signals in the 2.4 GHz frequency band, and antenna 306 of access point 302 is transceiving signals in the 5 GHz frequency band. 2.4 GHz connections 308a have been established between client devices 310 and 312 and antenna 304 of access point 302. Similarly, 5 GHz connections 308b have been established between client devices 310 and antenna 306 of access point 302. Client devices 310 are devices capable of communicating on both the 5 GHz frequency band and the 2.4 GHz frequency band. Client device 312 is a device capable of communicating on the 2.4 GHz frequency band but not the 5 GHz frequency band. In some examples, each 2.4 GHz connection 308a and 5 GHz connection 308b is assigned a specific channel within their respective frequency bands, resulting in a reduction in interference between client devices 310 and 312. Access point 302 is also coupled to network 314, which includes network controller 316. In some examples, access point 302 communicates network data to network 314 and receives network data from network 314. Further, in some examples, access point 302 receives management data from network controller 316 through network 314 and transmits management data to network controller 316 through network 314.

Figure 3B:
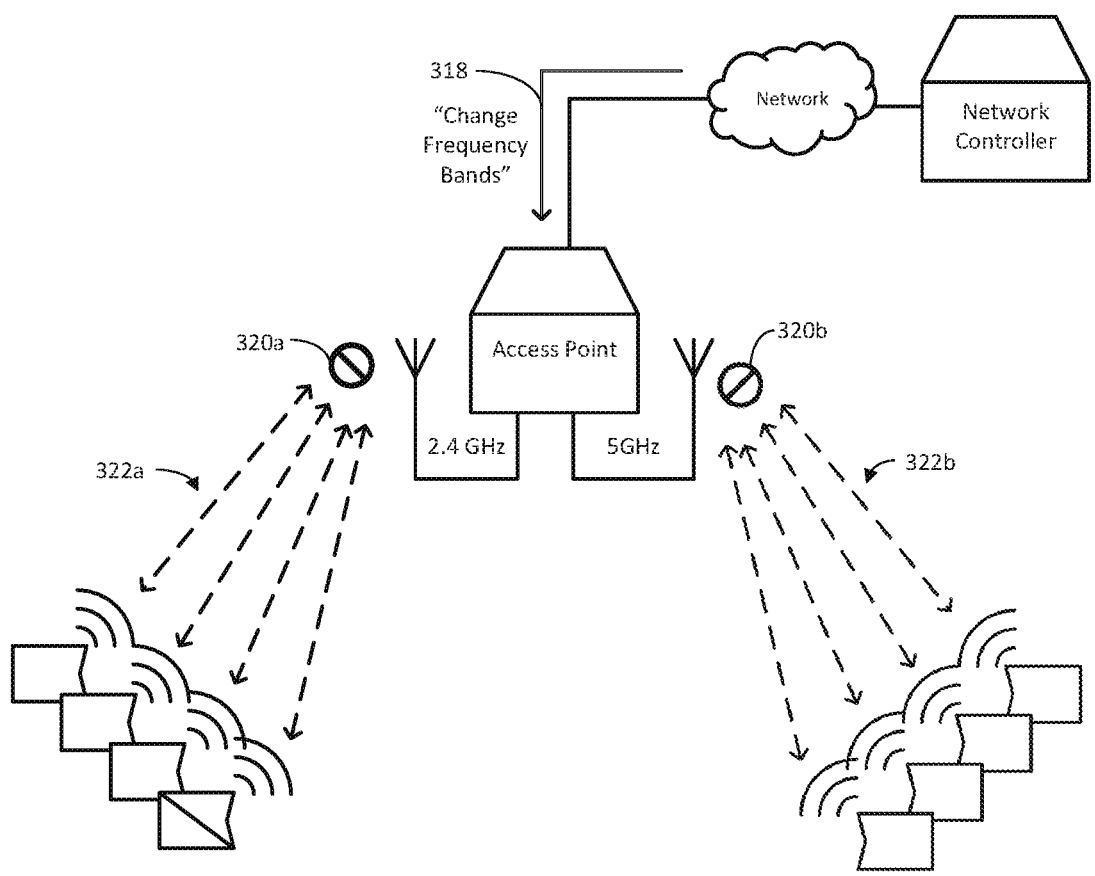
FIG. 3B illustrates the example wireless network of FIG. 3A after the access point receives a command.

In FIG. 3B, wireless network 300 is in a transition period as a result of receiving management command 318 to change frequency bands. Access point 302 receives management command 318 from network controller 316 as transmitted through network 314. In some examples, prior to receiving management command 318, access point 302 is configured in a dual-band mode. During the transition period, which may last less than 20 nanoseconds, antennas 304 and 306 disconnect 320 from client devices 310 and 312. As implied by disconnects 320, the 2.4 GHz connections 322a and the 5 GHz connection 322b are terminated. In some examples, antenna 306 starts a transition period, and antenna 304 immediately resumes transceiving signals in its new frequency sub-band. In such an example, disconnect 320b occurs, and disconnect 320a does not occur. In this example, the 5 GHz capable devices 310 coupled to antenna 304 are immediately reconnected on a 5 GHz channel. The 2.4 GHz device 312 has its connection 322a terminated.

Figure 3C:
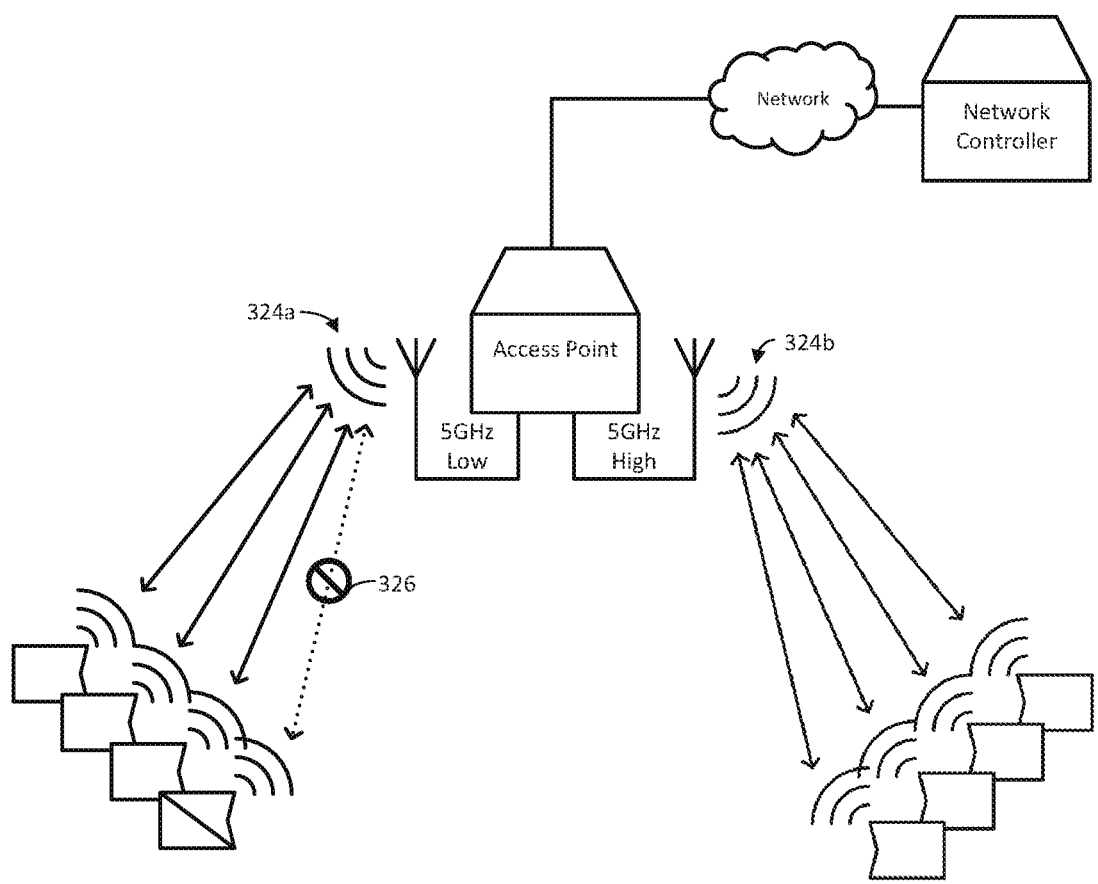
FIG. 3C illustrates the example wireless network of FIGS. 3A and 3B after the access point finishes the transition and begins operation in dual-5G mode.

In FIG. 3C, wireless network 300 resumes operation with access point 302 configured in a dual-5G mode. Once the transition period ends, access point 302 resumes operation with antenna 304 transceiving signals 324a in the 5 GHz low sub-band, and antenna 306 transceiving signals 324b in the 5 GHz high sub-band. 2.4 GHz device 312 has its connection terminated 326 since neither antenna 304 or 306 of access point 302 is currently transceiving signals on the 2.4 GHz frequency band. In some examples, an adjacent access point (not shown) may be transceiving signals on the 2.4 GHz frequency band and the geographic scope of the adjacent access point's 2.4 GHz coverage may include 2.4 GHz device 312. In such a case, 2.4 GHz device 312 may connect with the adjacent access point.

Figure 4:
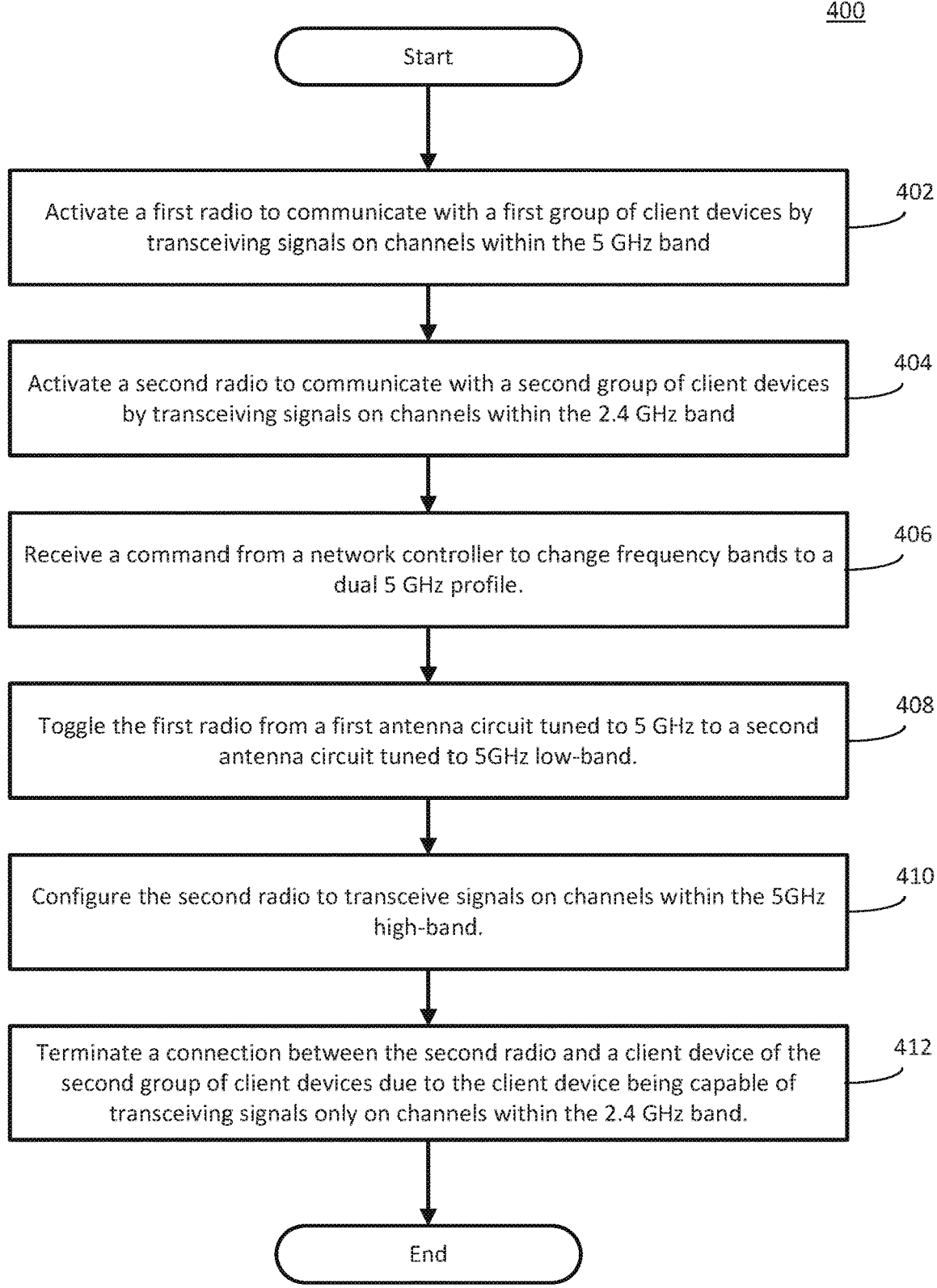
FIG. 4 is a flowchart describing an example method for operating an access point in dual-band and dual-5G modes.

FIG. 4 is a flowchart illustrating an example method 400 for operating an access point. In step 402, the access point activates a first radio to communicate with a first group of client devices by transceiving signals on channels within the 5 GHz frequency band. The access point may be in a dual-band mode, and may be configured to receive management commands from a network controller connected to the access point via a network. In some examples, the first radio has a shorter geographical connectivity range than a second radio configured to operate within the 2.4 GHz frequency band. However, in such examples, the first radio may be capable of transceiving at a higher data rate than the second radio. The first radio may be communicatively coupled to an antenna through antenna circuitry. In some examples, the first radio, the antenna, and the antenna circuitry may be integrated into a SOC. In some other examples, the first radio, the second radio, and their respective antenna circuitries and antennas may be integrated into a SOC. In yet other examples, certain portions of the radios, antennae, and antenna circuitries are individual components coupled together as appropriate.

In step 404, the second radio is activated by the access point to communicate with a second group of client devices by transceiving signals on channels within the 2.4 GHz frequency band. In some examples, the second group of client devices includes a first portion of devices that are able to transceive signals on the 5 GHz frequency band and the 2.4 GHz frequency band, and a second portion of devices that are able to transceive signals on the 2.4 GHz frequency band.

In step 406, the access point receives a command from a network controller to change frequency bands to a dual 5 GHz profile. The dual 5 GHz profile (a.k.a. dual-5G), uses the first radio to transceive signals on channels within a first sub-band of the 5 GHz frequency band, and the second radio to transceive signals on channels within a second sub-band of the 5 GHz frequency band. Due to the increased data rate of 5 GHz connections, the dual-5G profile may be used in situations where large groups of client devices have congregated in a geographical coverage area serviced by the access point. In some examples, the first and second sub-bands of the 5 GHz frequency band subsume all of the channels of the 5 GHz frequency band.

In step 408, the access point toggles the first radio from a first antenna circuit tuned to 5 GHz to a second antenna circuit tuned to 5 GHz low-band. In certain examples the access point toggles a pair of RF switches that were configured to bypass a band-pass filter while the access point was in dual-band mode. In dual-5G mode, the RF switches are configured to pass signals through the band-pass filter, which filters out 5 GHz high-band signals. In some other examples, the first radio is toggled from a first antenna circuit coupled to a first antenna to a second antenna circuit coupled to a second antenna.

In step 410, the access point configures the second radio to transceive signals on channels within the 5 GHz high-band. In some examples, the access point commands the second radio to change configuration in order to transceive the 5 GHz high-band signals. The second radio may receive 2.4 GHz signals at one input while simultaneously receiving 5 GHz high-band signals at a second input. Alternatively, the access point may also command a filter to output signals from a different portion, changing from a low-pass portion of the filter (for 2.4 GHz communication) to a band-pass portion (for 5 GHz communication).

In step 412, the access point terminates a connection between the second radio and a client device of the second group due to the client device being capable of transceiving signals on channels within the 2.4 GHz frequency band and not the 5 GHz frequency band. In some examples, an adjacent access point initiates a connection with the client device in the 2.4 GHz frequency band.

Figure 5:
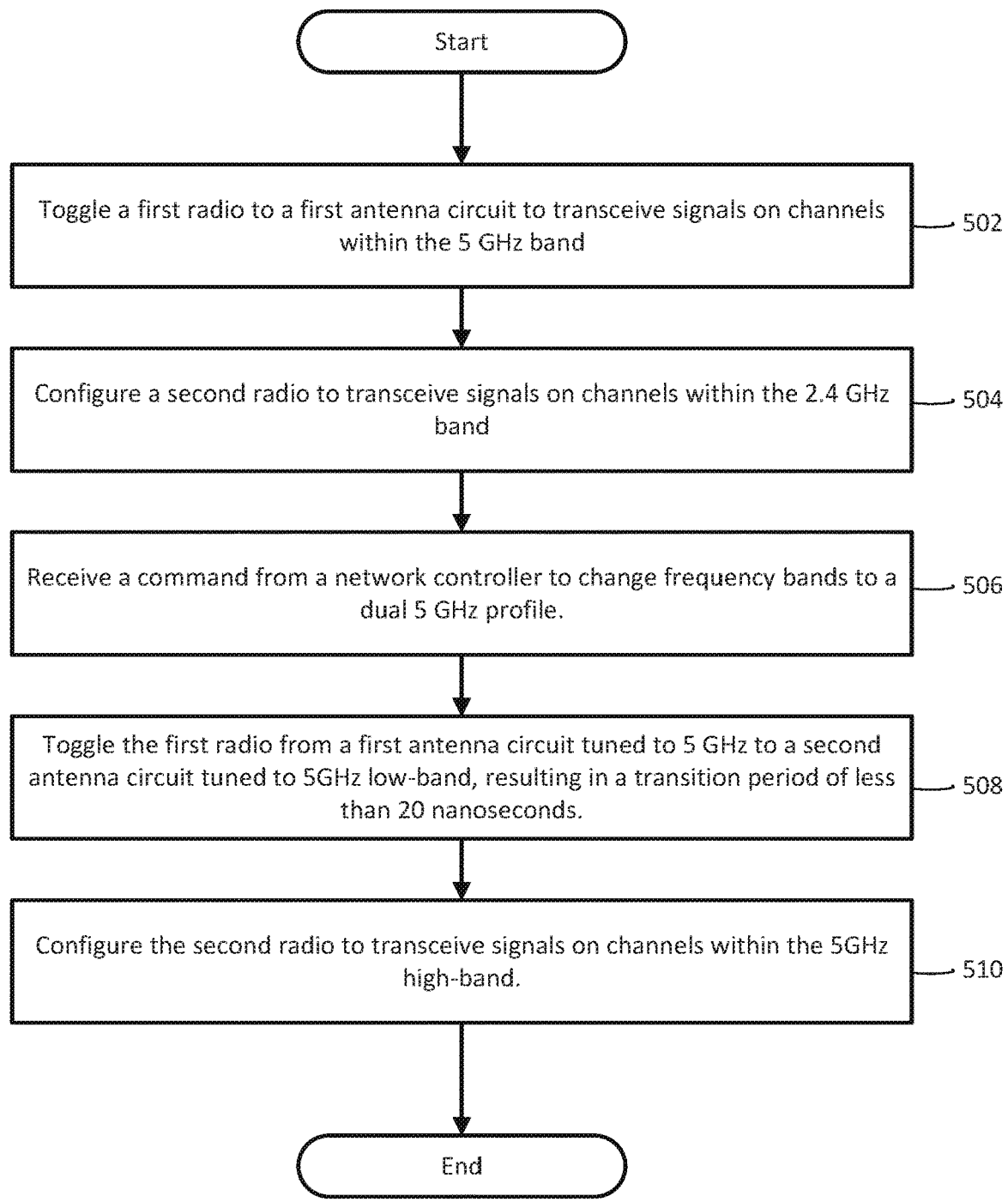
FIG. 5 is a flowchart describing an example method for an access point to transition from dual-band to dual-5G mode.

FIG. 5 is a flowchart of an example method 500 for operating an access point. In step 502, the access point toggles a first radio to a first antenna circuit to transceive signals on channels within the 5 GHz frequency band. In some examples, the access point may originally be in a dual-5G mode, and changes to a dual-band mode. In some other examples, upon initiation of the access point, step 502 may be executed to initiate the access point in dual-band mode.

In step 504, the access point configures a second radio to transceive signals on channels within the 2.4 GHz frequency band. Like step 502, step 504 may be executed in response to the access point changing to dual-band mode or upon initiation of the access point. In some examples, the access point sends a command to the second radio that reconfigures the second radio to transceive signal in the 2.4 GHz frequency band.

In step 506, the access point receives a command from a network controller through a network to change frequency bands to a dual 5 GHz profile. In some examples, the access point receives the command through an Ethernet connection to the network. The access point may receive a command that contains a network topology, and includes within the topology a command for the access point to change frequency bands.

In step 508, the access point toggles the first radio from a first antenna circuit tuned to 5 GHz to a second antenna circuit tuned to 5 GHz low-band, resulting in a transition period of less than 20 nanoseconds. In certain examples the access point toggles a pair of RF switches that were configured to bypass a band-pass filter while the access point was in dual-band mode, In dual-5G mode, the RF switches are configured to pass signals through the band-pass filter, which filters out 5 GHz high-band signals. In some other examples, the first radio is toggled from a first antenna circuit coupled to a first antenna to a second antenna circuit coupled to a second antenna.

In step 510, the access point configures the second radio to transceive signals on channels within the 5 GHz high-band. In some examples, the access point commands the second radio to change configuration in order to transceive the 5 GHz high-band signals. The second radio may receive 2.4 GHz signals at one input while simultaneously receiving 5 GHz high-band signals at a second input. Alternatively, the access point may also command a filter to output signals from a different portion, changing from a low-pass portion of the filter (for 2.4 GHz communication) to a band-pass portion (for 5 GHz communication).

FIG. 6 illustrate an example wireless network 600 including two access points 602*a* and 602*b*. Within FIG. 6, the conical shapes emanating from antennae 604 represent the geographical coverage areas in which each antenna 604 can sustain a connection with a client device 606 or 608. Geographical space is generally shown in the lateral axis of FIG. 6, but the geographical coverage areas are not drawn to scale. Generally, a 2.4 GHz geographical coverage area is larger than a 5 GHz geographical coverage area, and generally, geographical coverage areas are centered around the corresponding antenna, but the specific geographical coverage areas shown in FIG. 6 are shaped for the purpose of clarity, not for technical accuracy. Further, certain labels have been omitted for the sake of clarity. If an object is labeled in a figure, it should be presumed that the label applies to the same object in successive. FIG. 6, unless otherwise described. Also, if an object is labeled in a figure, it should be presumed that the label applies to identical unlabeled objects.

Figure 6A:
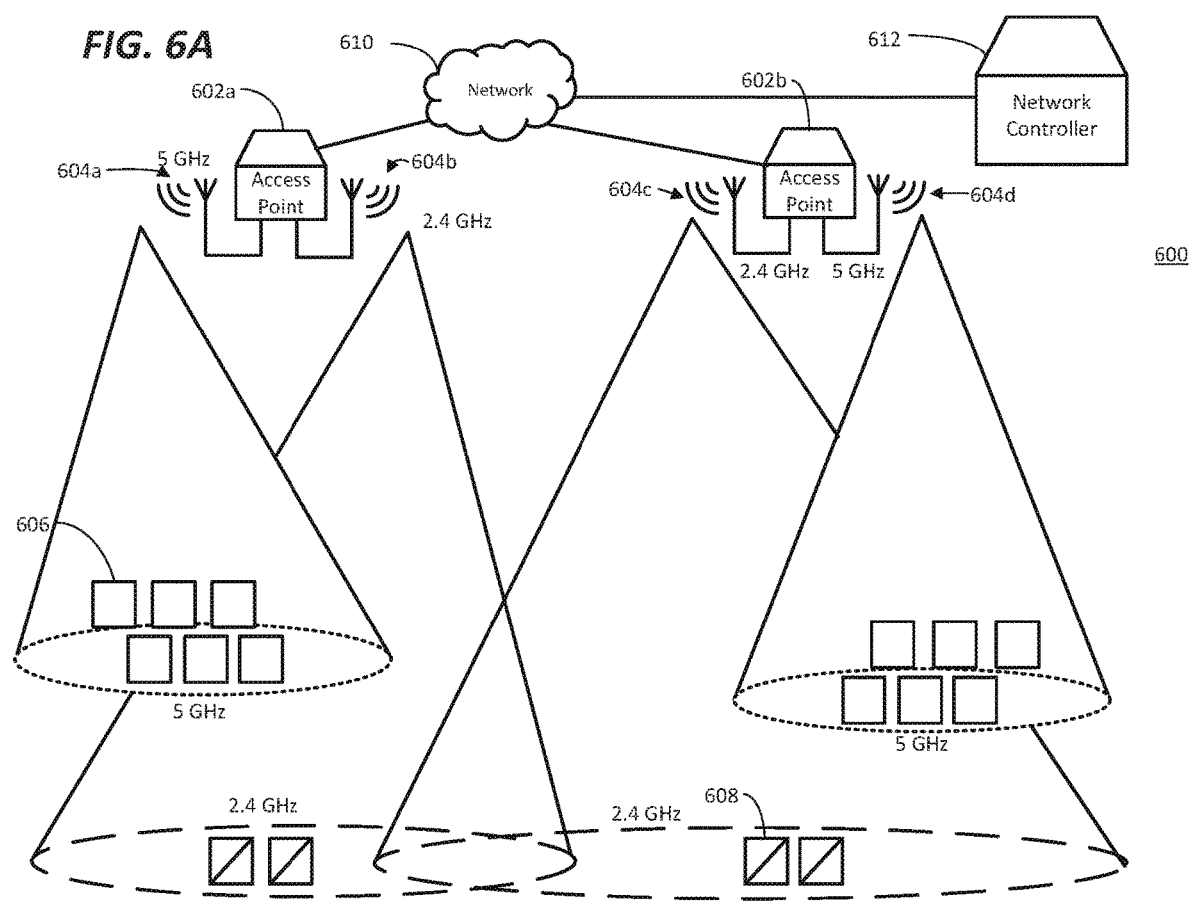
FIG. 6A illustrates an example wireless network including access points operating in dual-band and dual-5G modes.

FIG. 6A illustrates an example wireless network 600 including an access point 602a operating in dual-5G mode and an access point 602b operating in dual-band mode. Antenna 604a of access point 602a is configured to transceive signals on a 5 GHz high band, and is connected to a group of client devices 606 through 5 GHz high band channels. Antenna 604b of access point 602a is configured to transceive signals on a 5 GHz low band, and is connected to a group of client devices 606 through 5 GHz low band channels. Antenna 604c of access point 602b is configured to transceive signals on a 2.4 GHz frequency band, and is connected to a group of client devices 606 and a group of 2.4 GHz client devices 608 through 2.4 GHz channels. Antenna 604d of access point 602b is configured to transceive signals on the 5 GHz frequency band, and is connected to a group of client devices 606 through 5 GHz channels. As used herein, a 2.4 GHz client device may refer to a client device that can communicate with other network devices on the 2.4 GHz frequency band but no other frequency bands (e.g., 5 GHz frequency band).

Access points 602a and 602b communicate network data with network 610. In some examples, access points 602a and 602b communicate with network 610 via Ethernet. Access points 602a and 602b also communicate management data with network controller 612 through network 610. Management data can include management commands from network controller 612 to access points 602a and 602b.

FIG. 6B illustrates the example wireless network 600 of FIG. 6A, wherein client devices 606 have migrated within the geographical coverage area of 5 GHz connectivity for access point 602b. In some examples, access point 602b is located within proximity to a conference room or other space where client devices congregate. Some client devices 606 migrate 614 from the geographical coverage area of access point 602a, and some client devices 606 migrate 616 from the 2.4 GHz geographical coverage area of access point 602b to the 5 GHz geographical coverage area of access point 602b. As such, antenna 604d may become overloaded with traffic due to the multitude of client devices 606 connected to it. Access points 602a and 602b may communicate the changes in client device locations to network controller 612 through network 610 as management data.

FIG. 6C illustrates the example wireless network 600 of FIGS. 6A-B, wherein network controller 612 reconfigures wireless network 600 to handle the critical mass of client devices in the geographical coverage area of access point 602b. Network controller 612, upon determining that the network topology must change to handle the critical mass of client devices, sends a management command 618a through network 610 to access points 602a and 602b. In some examples, both access points 602a and 602b receive the same command message from network controller 612. In some other examples, access point 602a receives a first command message 618b and access point 602b receives a second command message 618c. Upon receiving the respective command messages 618, access points 602 reconfigure based on the new network topology.

Access point 602a reconfigures into dual-band mode. In some examples, access point 602a configures antenna 620a to transceive 2.4 GHz signals. Access point 602a may also configure antenna 620b to transceive 5 GHz signals.

Access point 602b reconfigures into dual-5G mode. In some examples, access point 602b configures antenna 620c to transceive 5 GHz high band signals. Access point 602b may also configure antenna 620d to transceive 5 GHz low band signals.

Once a transition period passes (of less than 20 nanoseconds), client devices 622 and 624 connect with the appropriate antennae 620. Client devices 622 that were previously connected to the 5 GHz antenna of access point 602b are split between antennae 620c and 620d after access point 602b reconfigures into dual-5G mode. 2.4 GHz devices 624 that were previously connected to the 2.4 GHz antenna of access point 602b have had their connections with access point 602b terminated, and have established new connections with antenna 620a of access point 602a. Client devices that were previously connected to the 5 GHz high and 5 GHz low antennae of access point 602a have all been reconnected to antenna 620b of access point 602a.

As a result, wireless network 600 has adapted to a critical mass of client devices 622 congregating in a small area by reconfiguring access points 602a and 602b between dual-band and dual-5G modes without a substantial downtime or manual reconfiguration.

Although the present disclosure has been described in detail, it should be understood that various changes, substitutions and alterations can be made without departing from the spirit and scope of the disclosure. Any use of the words "may" or "can" in respect to features of the disclosure indicates that certain embodiments include the feature and certain other embodiments do not include the feature, as is appropriate given the context. Any use of the words "or" and "and" in respect to features of the disclosure indicates that embodiments can contain any combination of the listed features, as is appropriate given the context.

The invention claimed is:

1. A method, comprising:
activating a first radio, by processing circuitry of a wireless access point, to communicate with a first set of client devices by transceiving signals on channels within a first frequency band;
activating a second radio, by the processing circuitry of the wireless access point, to communicate with a second set of client devices by transceiving signals on channels within a second frequency band;
receiving, at the processing circuitry of the wireless access point, a command from a network controller to change frequency bands of the wireless access point;
toggling, by the processing circuitry of the wireless access point, the first radio from a first antenna circuit to a second antenna circuit to connect the first radio to an antenna such that the first radio is capable of transceiving signals on channels within a first sub-band of the first frequency band; and
configuring, by the processing circuitry of the wireless access point, the second radio to transceive signals on channels within a second sub-band of the first frequency band,
wherein the first radio and the second radio are different, wherein the first set of client devices and the second set of client devices are different, wherein first frequency band and the second frequency band are different, wherein the first sub-band and the second sub-band are different, and wherein during the toggling and the configuring the first set of client devices reconnect to the first radio and a connection with the second set of client devices is terminated.

2. The method of claim 1, wherein toggling the first radio results in a transition period during which time the first radio cannot transceive signals on any frequency.

3. The method of claim 2, wherein the transition period is less than 20 nanoseconds.

4. The method of claim 1, wherein the first frequency band is a 5 GHz frequency band and the second frequency band is a 2.4 GHz frequency band.

5. The method of claim 1, wherein the channels within the first sub-band and the channels within the second sub-band comprise a totality of channels within the first frequency band.

6. The method of claim 1, further comprising terminating, at the second radio of the wireless access point, a connection with a client device capable of transceiving signals on channels within the second frequency band.

7. A wireless access point, comprising:
a connection interface to a network controller via which processing circuitry of the wireless access point receives a command to change frequency bands of the wireless access point;
a first radio to communicate with a plurality of client devices, wherein the first radio is coupled to a first antenna and a second antenna such that:
in response to the processing circuitry of the wireless access point receiving a first command to change to a first set of frequency bands, the first radio is toggled to a first antenna circuit and is capable of transceiving signals on channels within a first frequency band, and
in response to the processing circuitry of the wireless access point receiving a second command to change to a second set of frequency bands, the first radio is toggled to a second antenna circuit and is capable of transceiving signals on channels within a first sub-band of the first frequency band; and
a second radio to communicate with the plurality of client devices,
wherein when the wireless access point receives a command to change to a first set of frequency bands, the second radio is configured to be capable of transceiving signals on channels within a second frequency band, and
wherein when the wireless access point receives a command to change to a second set of frequency bands, the second radio is configured to be capable of transceiving signals on channels within a second sub-band of the first frequency band,
wherein the first radio and the second radio are different, wherein the first set of client devices and the second set of client devices are different, wherein first frequency band and the second frequency band are different, wherein the first sub-band and the second sub-band are different, and
wherein during the toggling and the configuring the first set of client devices reconnect to the first radio and a connection with the second set of client devices is terminated.

8. The wireless access point of claim 7, wherein toggling the first radio results in a transition period during which time the first radio cannot transceive signals on any frequency.

9. The wireless access point of claim 8, wherein the transition period is less than 20 nanoseconds.

10. The wireless access point of claim 7, wherein the processing circuitry of the wireless access point instructs the first radio to toggle and configures the second radio.

11. The wireless access point of claim 7, wherein the connection to the network controller is an Ethernet connection.

12. The wireless access point of claim 7, wherein the first frequency band is a 5 GHz frequency band, and the second frequency band is a 2.4 GHz frequency band.

13. The wireless access point of claim 12, wherein when the wireless access point receives the command to change to the second set of frequency bands, an antenna transceives signals in a first sub-band of the 5 GHz frequency band for the first radio, and the same antenna transceives signals in a second sub-band of the 5 GHz frequency band for the second radio.

14. A system, comprising:
a first plurality of client devices capable of transceiving signals both on channels within a first frequency band and channels within a second frequency band;
a second plurality of client devices capable of transceiving signals on channels within the second frequency band;
a first access point,
wherein upon receiving a first command, a processing circuitry of the first access point toggles a first radio of the first access point to a first antenna circuitry, causing the first radio to transceive signals on channels within the first frequency band such that a first portion of the first plurality of client devices communicate with the first access point based on geographic location and network load, and
wherein upon receiving the first command, the processing circuitry of the first access point configures a second radio of the first access point to transceive signals on channels within the second frequency band such that the second plurality of client devices communicate with the first access point; and
a network controller, wherein the network controller, upon determining a network topology adjustment, transmits the first command to the first access point to change to a first set of frequency bands and transmits a second command to a second access point to change to a second set of frequency bands,
wherein upon receiving the second command, a processing circuitry of the second access point toggles a third radio to a second antenna circuitry, causing the third radio to transceive signals on channels within a first sub-band of the first frequency band such that a second portion of the first plurality of client devices communicate with the third radio of the second access point based on geographic location and network load.

15. The system of claim 14, wherein upon receiving the second command, the processing circuitry of the second access point configures a fourth radio of the second access point to transceive signals on channels within a second sub-band of the first frequency band such that a third portion of the first plurality of client devices communicate with the fourth radio of the second access point based on geographic location and network load.

16. The system of claim 14, wherein the network controller is connected to the first access point and the second access point by an Ethernet connection.

17. The system of claim 14, wherein upon the first access point and the second access point receiving the first command and second command, respectively, a geographic coverage zone of the first access point with respect to the first frequency band overlaps a geographic coverage zone of the second access point with respect to the second frequency band.

18. The system of claim 14, wherein the determination the network topology adjustment results from a number of the first plurality of client devices in close proximity to the second access point exceeding a threshold.

19. The system of claim 14, wherein toggling the first radio of the first access point results in a transition period during which time the first radio cannot transceive signals on any frequency for less than 20 nanoseconds.

* * * * *